(12) United States Patent
Buccapatnam Tirumala et al.

(10) Patent No.: US 11,797,887 B2
(45) Date of Patent: *Oct. 24, 2023

(54) FACILITATING MAPPING OF CONTROL POLICIES TO REGULATORY DOCUMENTS

(71) Applicant: International Business Machines Corporation, Armonk, NY (US)

(72) Inventors: Swapna Buccapatnam Tirumala, Holmdel, NJ (US); Ashish Jagmohan, Irvington, NY (US); Elham Khabiri, Briarcliff Manor, NY (US); Ta-Hsin Li, Danbury, CT (US); Matthew Daniel Riemer, New York, NY (US); Vadim Sheinin, Yorktown Heights, NY (US); Aditya Vempaty, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 82 days.

This patent is subject to a terminal disclaimer.

(21) Appl. No.: 17/135,384

(22) Filed: Dec. 28, 2020

(65) Prior Publication Data

US 2021/0117794 A1  Apr. 22, 2021

Related U.S. Application Data

(63) Continuation of application No. 15/349,766, filed on Nov. 11, 2016, now Pat. No. 10,922,621.

(51) Int. Cl.
*G06F 16/33* (2019.01)
*G06N 20/00* (2019.01)
(Continued)

(52) U.S. Cl.
CPC ......... *G06N 20/00* (2019.01); *G06F 16/3346* (2019.01); *G06F 18/24* (2023.01);
(Continued)

(58) Field of Classification Search
CPC .. G06F 16/3346; G06F 40/242; G06F 40/295; G06F 40/30; G06F 16/36;
(Continued)

(56) References Cited

U.S. PATENT DOCUMENTS 7,206,389 B1   4/2007   Dumoulin et al.
7,702,618 B1   4/2010   Patterson
(Continued)

OTHER PUBLICATIONS

Maite Taboada, Julian Brooke, and Manfred Stede. "Genre-Based Paragraph Classification for Sentiment Analysis." Proceedings of SIGDIAL 2009: the 10th Annual Meeting of the Special Interest Group in Discourse and Dialogue, 2009. 62-70.
(Continued)

*Primary Examiner* — Abdelali Serrou
(74) *Attorney, Agent, or Firm* — Amin, Turocy & Watson, LLP

(57) ABSTRACT

Techniques for mapping policy documents to regulatory documents to check for compliance between the policies and documents are provided. In one example, a computer-implemented method determining, by a system operatively coupled to a processor, an information input, a control framework, and a document from a first group consisting of a regulatory document and a policy document, wherein the information input is a corpora from a second group consisting of a domain corpora and a global corpora. The computer-implemented method can also comprise mapping, by the system, the received regulatory document or the received policy document to the control framework using a supervised machine learning technique.

20 Claims, 10 Drawing Sheets

(51) Int. Cl.
*G06F 40/30* (2020.01)
*G06F 40/242* (2020.01)
*G06F 40/295* (2020.01)
*G06N 3/08* (2023.01)
*G06V 30/413* (2022.01)
*G06V 30/414* (2022.01)
*G06F 18/24* (2023.01)
*G06F 18/25* (2023.01)
*G06N 3/045* (2023.01)

(52) U.S. Cl.
CPC .......... *G06F 18/253* (2023.01); *G06F 40/242* (2020.01); *G06F 40/295* (2020.01); *G06F 40/30* (2020.01); *G06N 3/045* (2023.01); *G06N 3/08* (2013.01); *G06V 30/413* (2022.01); *G06V 30/414* (2022.01)

(58) Field of Classification Search
CPC ........ G06F 17/15; G06F 21/62; G06F 16/951; G06F 21/6218; G06F 16/24578; G06F 16/285; G06F 16/958; G06F 18/24; G06F 18/253; G06F 21/6245; G06F 40/253; G06F 9/448; G06F 16/334; G06F 16/3347; G06F 16/358; G06F 16/367; G06F 40/169; G06F 40/216; G06F 40/268; G06F 40/284; G06F 40/40; G06K 9/6267; G06K 9/629; G06N 3/0454; G06N 20/00; G06V 30/413; G06V 30/414; G10L 15/063; G10L 15/16; G10L 15/18

See application file for complete search history.

(56) References Cited

U.S. PATENT DOCUMENTS

| | | | |
|---|---|---|---|
| 8,661,059 B1 | 2/2014 | Cougias | |
| 8,996,566 B2 | 3/2015 | Haustein et al. | |
| 9,009,197 B2 | 4/2015 | Cougias | |
| 9,652,618 B1 | 5/2017 | Lerner | |
| 10,089,576 B2 | 10/2018 | Gao et al. | |
| 10,210,574 B2 | 2/2019 | Marin | |
| 10,223,650 B2 | 3/2019 | Liu et al. | |
| 10,291,628 B2* | 5/2019 | Allen | G06F 40/30 |
| 10,606,946 B2 | 3/2020 | Gao et al. | |
| 10,685,051 B2* | 6/2020 | Ludlow | G06F 3/04842 |
| 11,392,568 B2* | 7/2022 | Hopcroft | G06F 16/24578 |
| 2002/0103869 A1* | 8/2002 | Goatly | G06Q 10/10 709/206 |
| 2006/0288285 A1* | 12/2006 | Lai | G06F 40/226 715/708 |
| 2009/0119191 A1 | 5/2009 | Stuart et al. | |
| 2009/0132431 A1 | 5/2009 | Magary et al. | |
| 2009/0138795 A1 | 5/2009 | Liu et al. | |
| 2009/0138940 A1* | 5/2009 | Liu | H04L 41/5045 726/1 |
| 2009/0234782 A1 | 9/2009 | Apte et al. | |
| 2011/0029491 A1* | 2/2011 | Joshi | G06F 16/334 707/E17.008 |
| 2011/0225159 A1* | 9/2011 | Murray | G06F 16/358 707/739 |
| 2011/0320502 A1 | 12/2011 | Marin | |
| 2012/0030152 A1* | 2/2012 | Pueyo | G06F 16/3331 707/723 |
| 2012/0046991 A1 | 2/2012 | Bai et al. | |
| 2012/0179634 A1 | 7/2012 | Chen et al. | |
| 2012/0216173 A1 | 8/2012 | Liu et al. | |
| 2013/0172548 A1 | 7/2013 | Dekany et al. | |
| 2014/0025608 A1 | 1/2014 | Miller et al. | |
| 2014/0122388 A1 | 5/2014 | Bai et al. | |
| 2014/0129593 A1 | 5/2014 | Cougias | |
| 2014/0207782 A1* | 7/2014 | Ravid | G06F 16/335 707/739 |
| 2014/0297269 A1 | 10/2014 | Qian et al. | |
| 2016/0070731 A1 | 3/2016 | Chang et al. | |
| 2016/0196499 A1 | 7/2016 | Khan et al. | |
| 2016/0328388 A1 | 11/2016 | Cao et al. | |
| 2016/0336006 A1* | 11/2016 | Levit | G10L 15/18 |
| 2016/0350885 A1 | 12/2016 | Clark | |
| 2016/0378853 A1 | 12/2016 | Mohammad | |
| 2017/0351750 A1 | 12/2017 | Rokhlenko et al. | |
| 2018/0260860 A1 | 9/2018 | Devanathan et al. | |

OTHER PUBLICATIONS

Leroy, G. et al., "Meeting Medical Terminology Needs—The Ontology-Enhanced Medical Concept Mapper", IEEE Transactions on Information Technology in Biomedicine, Dec. 2001, pp. 261-270.

Quoc Le, and Mikolov, Tomas. "Distributed Representations of Sentences and Documents." Proceedings of the 31st, International Conference on Machine Learning, 2014.

Mikolov, Tomas, et al. "Efficient estimation of word representations in vector space." arXiv preprint arXiv:1301.3781 (2013).

Pennington, Jeffrey, Richard Socher, and Christopher D. Manning. "Glove: Global vectors for word representation." Proceedings of the Empirical Methods in Natural Language Processing (EMNLP 2014) 12 (2014): 1532-1543.

lst of IBM Patents or Applications Treated as Related.

Non-Final Office Action received for U.S. Appl. No. 15/349,766 dated Sep. 13, 2017, 38 pages.

Final Office Action received for U.S. Appl. No. 15/349,766 dated Apr. 4, 2018, 31 pages.

Bahdanau et al. ("End-to-end Attention-based Large Vocabulary Speech Recognition" ICASPP 2016, Mar. 20-25, 2016). 5 pages.

Non-Final Office Action received for U.S. Appl. No. 15/349,766 dated Dec. 17, 2018, 32 pages.

Final Office Action received for U.S. Appl. No. 15/349,766 dated Sep. 5, 2019, 31 pages.

Non-Final Office Action received for U.S. Appl. No. 15/349,766 dated Mar. 19, 2020, 33 pages.

Notice of Allowance received for U.S. Appl. No. 15/349,766 dated Sep. 23, 2020, 23 pages.

* cited by examiner

FACILITATING MAPPING OF CONTROL POLICIES TO REGULATORY DOCUMENTS

BACKGROUND

The subject disclosure relates to determining compliance between documents, and more specifically, to mapping of control policies to regulatory documents for compliance determination.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, processes, methods, and products which facilitate mapping control policy to regulatory documents to check for compliance are described.

According to an embodiment, a computer-implemented method is provided. The computer-implemented method can comprise: determining, by a system operatively coupled to a processor, an information input, a control framework, and a document from a first group consisting of a regulatory document and a policy document, wherein the information input is a corpora from a second group consisting of a domain corpora and a global corpora; and mapping, by the system, the regulatory document or the policy document to the control framework using a supervised machine learning technique.

In another embodiment, another computer-implemented method can comprise: determining, by a system operatively coupled to a processor, a regulatory document, a policy document, a control framework, an information input, and an expert mapping input, wherein the information input is from a first group consisting of a domain corpora and a global corpora; and mapping, by the system, the regulatory document and the policy document via the control framework using a supervised machine learning technique.

In another embodiment, a system is provided. The system can comprise: a memory that stores computer executable components; and a processor that executes the computer executable components stored in the memory. The computer executable components can comprise: a reception component that receives a control framework, an information input and one of a regulatory document or a policy document, wherein the information input comprises corpora from a first group consisting of domain corpora and global corpora; an extraction component that extracts one or more features from the information input and one of the regulatory document or the policy document; and a modeling component that maps the one or more features to the control framework using a supervised machine learning technique.

In another embodiment, another system is provided. The system can comprise: a memory that stores computer executable components; and a processor that executes the computer executable components stored in the memory. The computer executable components can comprise: a reception component that receives a regulatory document, a policy document, a control framework, and an information input, wherein the information input comprises a corpora from a group consisting of domain corpora and global corpora; an extraction component that extracts one or more features from the regulatory document, the policy document, and the information input; and a mapping component that maps the one or more features to the control framework using a supervised machine learning technique.

In another embodiment, a computer program product for determining compliance between documents is provided. The computer program product can comprise a computer readable storage medium having program instructions embodied therewith, the program instructions executable by a processing component to cause the processing component to: determine a regulatory document, a policy document, a control framework, an information input, and an expert mapping input, wherein the information input comprises a corpora from a first group consisting of a domain corpora and a global corpora; generate a regulatory model by mapping one or more first features from the regulatory document one or more obligations and one or more second features from the information input to the control framework; generate a control model by mapping the one or more second features and one or more third features from the policy document to the control framework; and combine the regulatory model and the control model.

DETAILED DESCRIPTION

Figure 1:
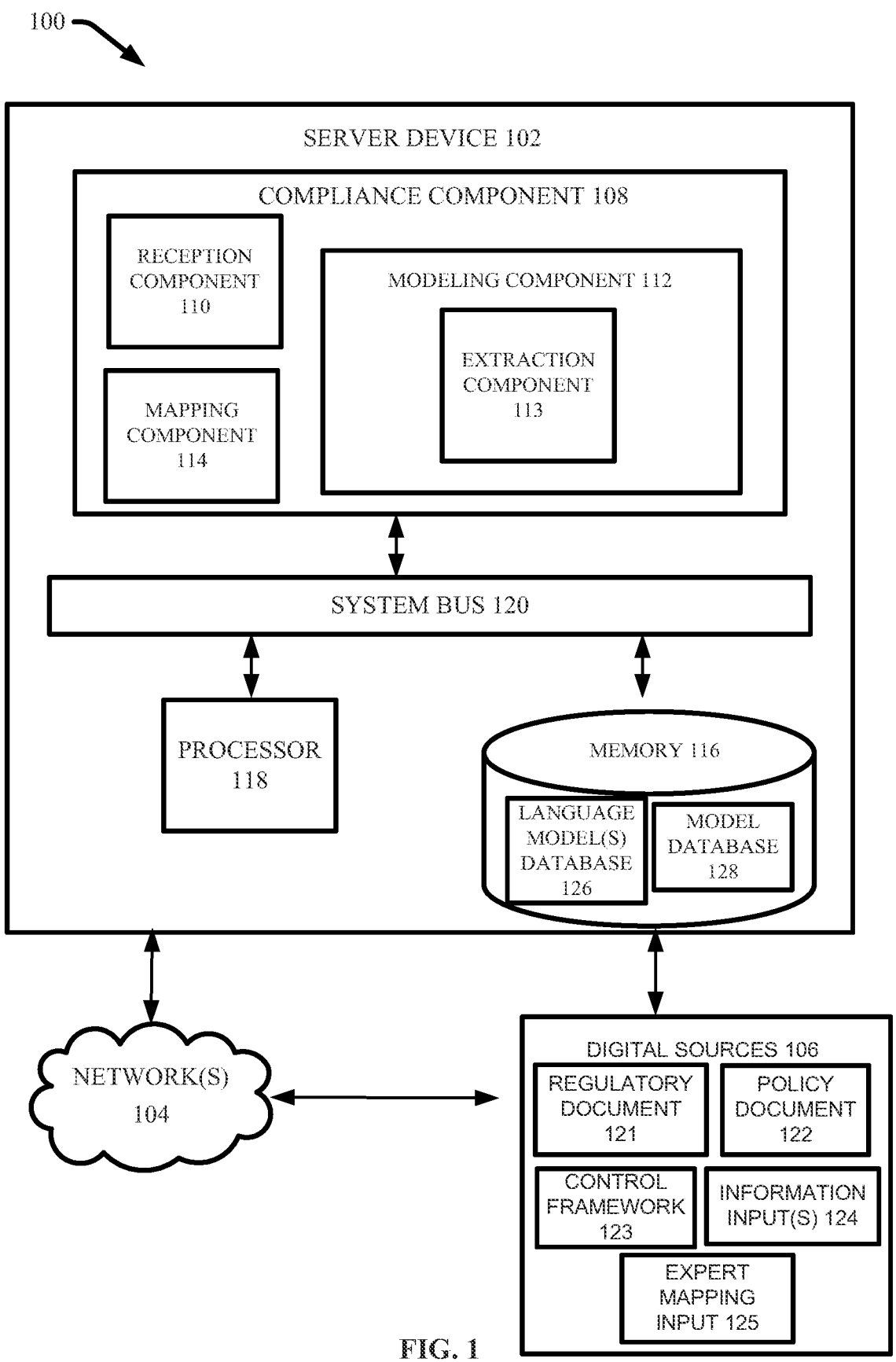
FIG. 1 illustrates a block diagram of an example, non-limiting system that facilitates mapping control policies to regulatory documents to determine compliance in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Companies often institute control policies in view of regulatory documents to ensure their practices are in compliance with governing laws and regulations. Regulatory documents can be extensive, complex, and subject to change. As used herein, the term "regulatory document" can refer to a document or collection of documents, in any medium (e.g., paper or electronic) that describes one or more obligations governing a subject matter (e.g., the finance field). Also, as used herein, the term "obligation" can refer to text or data that describes a requirement of law, rule, regulation, guideline, or the like concerning a given topic.

The subject disclosure is directed to computer processing systems, computer-implemented methods, apparatus and/or computer program products that facilitate efficient, effective, and automatic (e.g., without direct human involvement) mapping of control policies to one or more regulatory documents. For example, mapping control policies to a regulatory document can include: identifying relevant obligations in the regulatory document, recognizing key words or phrases in the obligations, determining how the obligations relate to each other, and determining whether there is a section in the control policy that properly meets the obligations in view of the meaning of the obligation and context in the regulatory document.

The computer processing systems, computer-implemented methods, apparatus and/or computer program products described herein can employ hardware and/or software to solve problems that are highly technical in nature such as the automated and detailed electronic mapping of control policies to regulatory documents given an understanding of meaning and context of obligations described in the regulatory document. Thus, the systems, methods, and products described herein should not be considered abstract as they cannot be practiced via the mental acts of a human. For example, a single human, or even hundreds of humans, cannot analyze a global corpus (e.g., the Internet) to provide supplemental context to obligations described in a regulatory document. One or more embodiments of the present invention can enable the automated mapping of control policies to regulatory documents in a highly accurate and efficient manner.

FIG. 1 illustrates a block diagram of an example, non-limiting system 100 that facilitates mapping control policies to regulatory documents to determine whether the control policies are in compliance with the regulatory documents in accordance with one or more embodiments described herein. Aspects of systems (e.g., system 100 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

The system 100 can comprise: a server device 102, one or more networks 104, and one or more digital sources 106. The server device 102 can include a compliance component 108 which can comprising: a reception component 110; a modeling component 112 that can further comprise an extraction component 113; and a mapping component 114. Further, the server device 102 can comprise at least one memory 116 and at least one processor 118. The memory 116 can store computer executable components (e.g., the compliance component 108 and associated components). The processor 118 can execute the computer executable components stored in the memory 116. Moreover, the server device 102 can further comprise a system bus 120. The system bus 120 can couple the various features of the server device 102 including, but not limited to, the compliance component 108, memory 116, and/or processor 118. While a server device 102 is shown in FIG. 1, in other embodiments, the system 100 can comprise various devices of different types which can be associated with or include the features of the server device 102 as part of the compliance component 108.

The digital sources 106 can comprise one or more regulatory documents 121, one or more policy documents 122, a control framework 123, one or more expert mapping inputs 125, and/or one or more information inputs 124. The regulatory document(s) 121 can include one or more sources relating to obligations governing a given subject matter. The policy documents 122 can include one or more sources relating to an entity operating procedures. The topic of the regulatory document 121 and the topic of the policy document 122 can be the same or different in various embodiments. The control framework 123 can comprise a classification architecture relating to the topic and/or field of the regulatory document 121 or the control document 123 (e.g. a taxonomy).

The compliance component 108 can facilitate determining whether one or more policy documents 122 are in compliance with one or more governing obligations. In particular, the compliance component 108 can map the policy documents 122 to the control framework 123 to generate a model, and map the regulatory documents 121 to the control framework 123 to generate a second model. By combining the models, the system 100 can determine whether or not the policy documents 122 are missing a requirement described by the regulatory documents 121.

The reception component 110 can receive the digital sources 106 for processing by the compliance component 108 to construct models comprising obligations or control policies governing a particular topic to check for compliance between the models. For example, the reception component 110 can receive the regulatory documents 121, policy documents 122, control framework 123, expert mapping inputs 125, and information inputs 124

The digital sources 106 can be accessible to the server device 102 directly or via one or more networks 104. The networks 104 can comprise at least one of internal networks (e.g., an intranet) or external networks (e.g., the Internet). For example, the digital sources 106 can be received by the reception component 110 via an intranet such as a company corporate network. Also, one or more of the digital sources 106 can be received by the reception component 110 via download from a website (e.g., the regulatory document 121 can be received from a website maintained by a governing body).

In some embodiments, the reception component 110 can receive the one or more of the digital sources 106 that are uploaded to the server device 102 from a client device. For example, a human (e.g., a subject expert) can manually upload a regulatory document 121 and/or a policy document 122 from a computerized device via the network 104. In another example, a subject expert can annotate one or more of the digital sources 106 to facilitate formation of a model, and upload the annotations via the network 104. In various embodiments, one or more of the uploading and/or annotation and/or analysis can be performed automatically by a specialized computer configured to perform such functions.

In some embodiments, the reception component 110 can scan the networks 104 for missing digital sources 106 and/or new digital sources 106. For example, the reception component 110 can scan at least one of numerous websites, applications, or network accessible storage devices for regulatory documents 121 that can be utilized to construct a model comprising obligations governing a given topic. In various embodiments, the reception component 110 can comprise hardware (e.g., a central processing unit (CPU), a transceiver, a decoder), and/or software (e.g., a set of threads, a set of processes, software in execution) that facilitates receiving text from one or more digital sources 106.

The various components (e.g., server device 102, compliance component 108 and associated components, digital sources 106) of system 100 can be connected either directly or via one or more networks 104. Such networks 104 can include wired and wireless networks, including, but not limited to, a cellular network, a wide area network (WAN) (e.g., the Internet) or a local area network (LAN). For example, the server device 102 can communicate with one or more digital sources 106 (and vice versa) using virtually any desired wired or wireless technology, including, for example, cellular, WAN, wireless fidelity (Wi-Fi), Wi-Max, WLAN, and etc. Further, although in the embodiment shown the compliance component 108 is provided on a server device 102, it should be appreciated that the architecture of system 100 is not so limited. For example, the compliance component 108 or one or more components of the compliance component 108 can be located at another device, such as another server device, a client device, etc.

Figure 2:
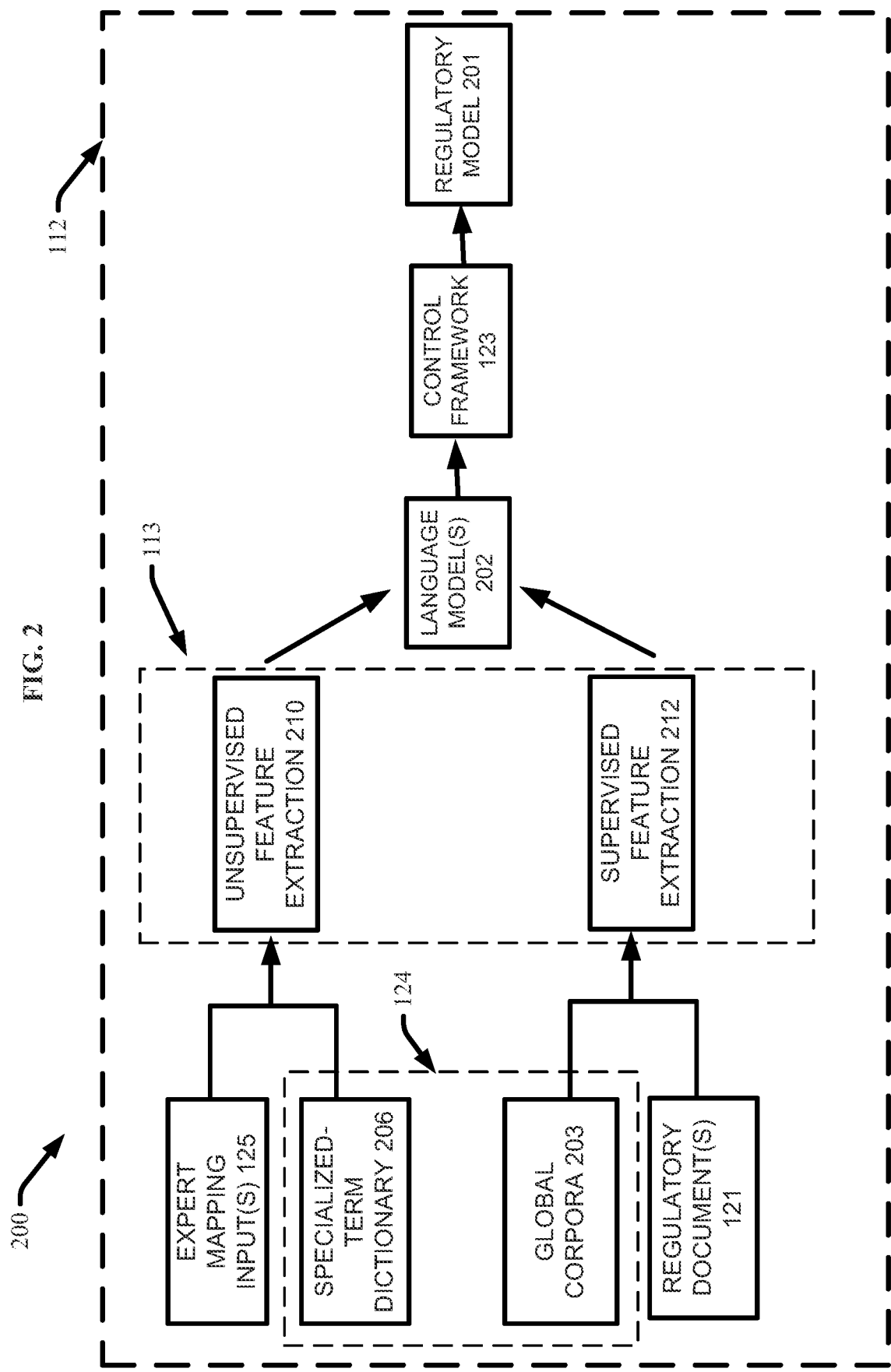
FIG. 2 illustrates a block diagram of an example, non-limiting computer-implemented process facilitating generation of a regulatory model in accordance with one or more embodiments described herein.

In various embodiments, the modeling component 112 can generate a new regulatory model 201 comprising one or more obligations governing a given topic by utilizing one or more digital sources 106. The regulatory model 201 can comprise one or more language models 202 containing content extracted from the digital sources 106. The regulatory model 201 can be structured in any manner which facilitates organizing the one more or language models 202 to indicate the extraction location and content of features from the digital sources 106. For example, the regulatory model 201 can be a spreadsheet, a table, and/or an annotated tree diagram. FIG. 2 shows a flow diagram illustrating a first model building process 200 in which the modeling component 112 can be configured to generate a regulatory model 201 according to one or more embodiments. Repetitive description of like elements employed in other embodiments described herein is omitted for sake of brevity.

The modeling component 112 can receive the digital sources 106 as inputs via the reception component 110. For example, the inputs can include the expert mapping inputs 125, the information inputs 124, and the regulatory documents 121. The expert mapping inputs 125 can comprise annotations made by subject experts regarding the control framework 123. The information inputs 124 can comprise at least one of a global corpora 203 or a domain corpora (e.g., specialized-term dictionary 206). The global corpora 203 can comprise a general internet-based collection of texts derived from various sources (e.g., GUTENBERG®, REUTERS®, COMMON CRAWL®, and/or GOOGLE NEWS®). The regulatory document 204 can comprise one or more documents which describe obligations regarding a given topic (e.g., financial regulations, information technology, the Security Exchange Commission, etc.), such as: statutes, law codifications, government regulations, and the like. An example of a domain corpora included in the information inputs 124 can include the specialized-term dictionary 206, which can comprise particular definitions for terms relating to the topic and/or field of the regulatory document 204. In an embodiment of the present invention, the modeling component 112 utilizes the regulatory document(s) 121, the global corpora 203, and the expert mapping input(s) 125 in constructing a new regulatory model 201. In another embodiment, the modeling component 112, in generating a new regulatory model 201, can utilize the regulatory document(s) 121, the specialized-term dictionary 206, and the expert mapping input(s) 125. In another embodiment, the modeling component 112, in generating a new regulatory model 201, can utilize two of the regulatory document(s) 121, the global corpora 203, the specialized-term dictionary 206, and the expert mapping input(s) 125.

The extraction component 113 can analyze at least one of the specialized term dictionary 206 or the expert mapping input(s) 125 and perform an unsupervised feature extraction 210. The unsupervised feature extraction 210 can involve automatically identifying features described by the specialized term dictionary 206 and/or expert mapping input(s) 125 which can be sorted into a language model 202 or utilized to create a language model 202 without requiring the supervision of a subject expert. A language model 202 can comprise an organized body of data containing one or more extracted features categorized to readily depict the content of the feature(s) and the feature(s) relation to the digital sources 106. Language models 202 can have various structures, such as but not limited to, spreadsheets, tables, and/or annotated diagrams (e.g., tree diagrams). Features extracted during the unsupervised feature extraction 210 can include, but are not limited to: headings, sub-headings, section references, section nomenclature, terminology, definitions, terminology synonyms, terminology representations, terminology paraphrases, segment-taxonomy tree, semantic similarity between terms and/or segments, and the like.

In some embodiments, the unsupervised feature extraction 210 can analyze at least one of the specialized term dictionary 206 or the expert mapping input(s) 125 utilizing neural network (NN) attention techniques. In other embodiments, the unsupervised extraction 210 can analyze at least one of the specialized term dictionary 206 or the expert mapping input(s) 125 utilizing term frequency-inverse document frequency (TFIDF) extraction techniques. TFIDF extraction can be used to extract key features from a document by considering a document (e.g., the taxonomy 208) in conjunction with a larger corpus regarding the document (e.g., the global corpus 203). For example, TFIDF can determine a ratio of a feature's occurrence in the taxonomy 208 in conjunction with the inverse of the share of documents in the global corpus 203 in which the regarded feature can be found. Further, the density (e.g., disbursement in a document) of a feature can be considered in determining the relevance of the feature.

Figure 3:
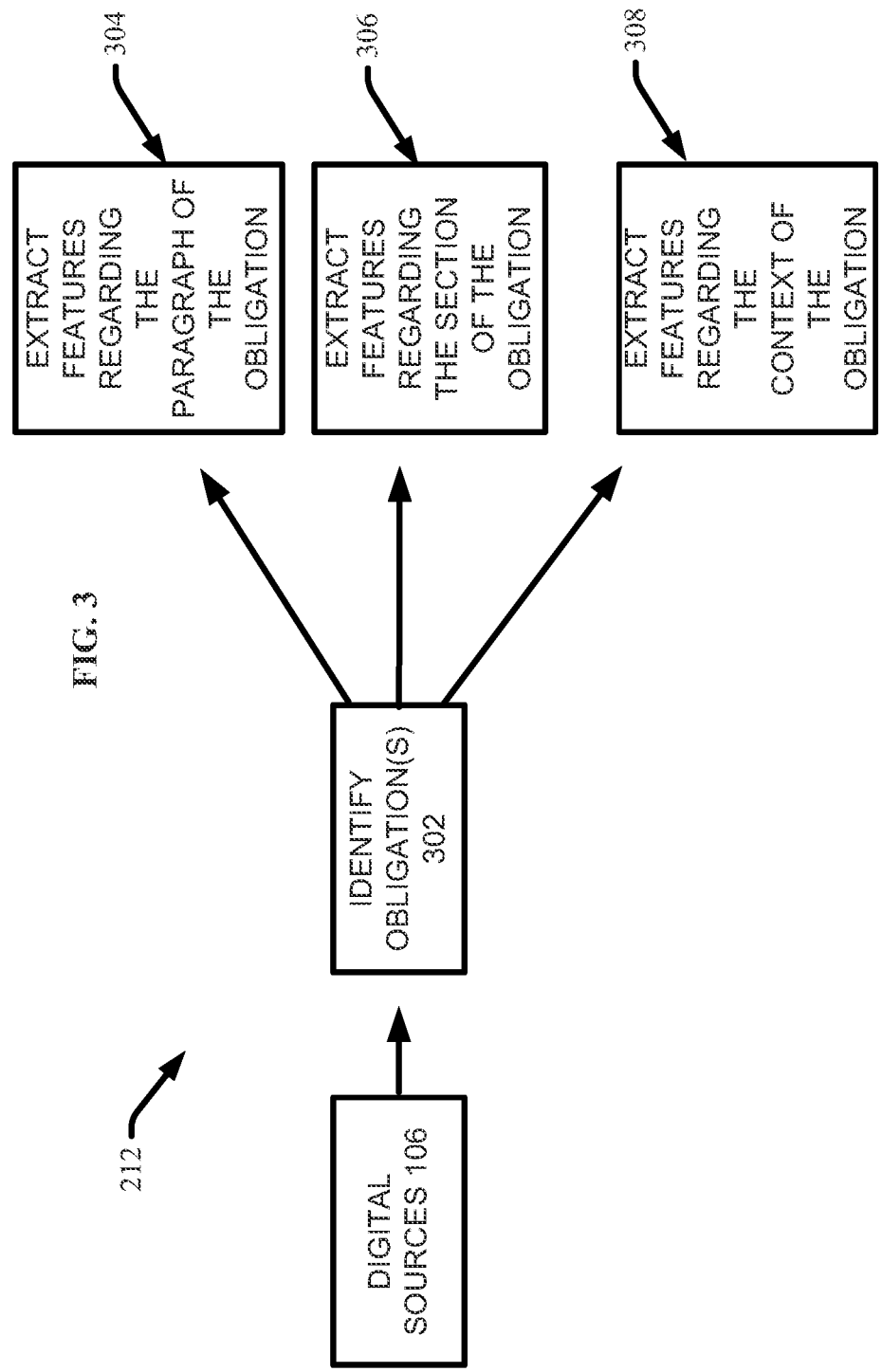
FIG. 3 illustrates a block diagram of an example, non-limiting computer-implemented process facilitating performance of a supervised feature extraction in accordance with one or more embodiments described herein.

The extraction component 113 can further analyze at least one of the regulatory documents 121 or the global corpora 203 to perform a supervised feature extraction 212. FIG. 3 shows a flow diagram illustrating the supervised extraction 212 process according to one or more embodiments. Repetitive description of like elements employed in other embodiments described herein is omitted for sake of brevity.

At 302, the received digital sources 106 (e.g., the regulatory documents 121) can be analyzed to identify one or more obligations. Features (e.g., content) of each of the identified obligations can be extracted in regards to at least one of three categories: the paragraph from which the obligation is located 304; the section from which the obligation is located 306; or the context of the obligation 308. For example, at 304 features regarding the obligation's paragraph can include, but are not limited to: number, title, structure, content, topic, and the like. At 306 features regarding the obligation's section can also include, but are not limited to: number, title, structure, content, topic, and the like. Further, at 308 the content of text surrounding the obligation, the content of the obligation, and the global corpora 203 can be considered to determine features which relate a context of the subject obligation. For each of the categories, features can be extracted regarding the identified obligation via at least one word embedding technique, such as but not limited to: TFIDF, TFIDF based cosine, word to vector, word to vector based cosine, and NN attention similarity to label. Each of the word embedding techniques can extract a feature as a vector which can be incorporated into the language model(s) 202. Additionally, each vector can vary in size. Incorporation of the extracted features into the language model(s) 202 can be supervised by a subject expert.

The number of features extracted for each obligation is dependent on the number of categories and word embedding techniques employed. In an embodiment, all variations of one to three categories and one to five word embedding techniques are envisaged. For example, the supervised feature extraction 212 can extract features in regards to all three categories described above (e.g., 304, 306, and 308) of the identified obligation. Also, the supervised extraction 212 can utilize five different word embedding techniques (e.g., TFIDF, TFIDF based cosine, word to vector, word to vector based cosine, and NN attention similarity to label) to extract features (e.g., create vectors) for incorporation into the language models 202. Thus, the supervised feature extraction 212 can extract fifteen features for each identified obligation. In another example, the supervised feature extraction 212 can comprise two categories (e.g., 304 and 306; 306 and 308; or 304 and 308) along with four word embedding techniques to extract eight features for each identified obligation.

The supervised feature extraction 212 can result in the extraction of features from the regulatory document(s) 121 which can include, but are not limited to, the content of governing obligations and context of the obligations. Features relating the context of the identified obligations can describe how obligations relate to each other and to the regulatory document(2) 121 as a whole. In some embodiments, the global corpora 203 is used in conjunction with one or more of the word embedding techniques to provide a context in view of modern discussions and expert opinion. At least consideration of the global corpora 203 and incorporation of numerous features for each identified obligation, enables the supervised feature extraction 212 to provide a more accurate context for identified obligations than conventional systems.

Thus, features can be extracted from the expert mapping input(s) 125 and specialized-term dictionary 206 (in reference to the global corpora 203) to create language models 202 via the unsupervised feature extraction 210, and additional features can be extracted from the regulatory document(s) 121 and the global corpora 203 to further populate the language model(s) 202, and/or create new language model(s) 202, with obligation content and context via the supervised feature extraction 212. In an embodiment, the extraction component 113 can further perform an unsupervised extraction 210 on the control framework 123 using embedding techniques, such as NN attention modeling and TFIDF, to create language models 202 for the control framework 123 that can be combined to create a model of the control framework 123.

Referring back to FIG. 2, the modeling component 112 can further generate one or more mappers. The mappers can combine one or more of the language models 202 and identify where and how the language model(s) 202 correspond to subject matter in the control framework 123. The mappers can utilize one or more software packages that describe behavioral and structural elements of the extracted features, and can be constructed using techniques such as, but not limited to: intra-class correlation coefficient/natural language classifier (ICC/NLC); fast extreme multi-label learning (FastXML); support vector classification (SVC) (e.g., a support vector machine (SVM)); recursive flow classification (RFC); Glmnet; one-vs.-rest (OVR); semantic similarity (sem-sim) classification; or a combination thereof.

The modeling component 112 can combine the mappers together and with the control framework 123, thereby mapping the language model(s) 202 to the control framework 123, via one or more ensemble learning techniques. Types of ensemble learning techniques which can be used to create the regulatory model 201 can include, but are not limited to: Bayes optimal classifier, bootstrap aggregating (aka "bagging"), boosting, Bayesian parameter averaging, Bayesian model combination, stacking, and NN attention techniques. In an embodiment, stacking is used as the ensemble learning technique. Stacking (aka "stacked generalization") can comprise combining algorithms created by each of the mappers into a single algorithm. Once the mappers are combined, the regulatory model 201 can comprise all (or, in some embodiments, one or more of) the identified obligations, including content and context, in an organizational structure which conveys each obligation's relation to each other and the regulatory document(s) 121. As a result, features are extracted from the regulatory document(s) 121, one or more of the information input(s) 124, and the expert mapping input(s) 125, and the features are mapped to the control framework 123 to generate a regulatory model 201. Also, the ensemble learning technique can generate one or more confidence scores associated with one or more of the features comprising the regulatory model 201 to show the regulatory model's 201 confidence regarding the placement and description accuracy of the subject feature.

In an embodiment, the mapping component 114 can map the policy document(s) 122 to the regulatory model 201. For example, the mapping component 114 can extract one or more features from the policy document(s) 122 and match them to corresponding features in the regulatory model 201. The mapping component 114 can extract features from the policy document(s) 122 using the same techniques described herein in regards to the unsupervised extraction 210 or the supervised extraction 212. By matching the extracted policy document(s) 122 features to the regulatory model 201 the compliance component 108 can determine whether the policy document(s) 122 comply with all (or, in some embodiments, one or more) the obligations of the regulatory document(s) 121. For example, the occurrence of segments of the regulatory model 201 without a matched policy document 122 feature can indicate a gap in the policy document(s)'s 122 coverage (e.g., the policy document(s) 122 does not describe a feature which meets the requirements of one or more obligations from the regulatory document(s) 121) which may result in non-compliance. In contrast, if each segment of the regulatory model 201 (e.g., each feature comprising the regulatory model 201) has a corresponding policy document 122 feature, then the policy document(s) 122 can be consider compliant with the obligations of the regulatory document(s) 121.

Features extracted from the policy document 122 can be matched to the regulatory model 201 based on content and/or context of the features comprising the regulatory model 201 and the subject policy document(s) 122 feature. In one embodiment, the mapping component 114 can identify an obligation from the policy document(s) 122, extract features regarding the identified policy document(s) 122 obligation, and match the features to the regulatory model 201. For example, the mapping component 114 can identify a segment of text in the policy document(s) 122 which directs substantive documents in connection with audits and reviews to be retained for at least 28 quarters as an obligation. Further, the mapping component 114 can extract features regarding the obligation from the policy document(s) 122, including but not limited to: the section number, label, and title from which the obligation originates (e.g., "Section 10: Document Retention"); the paragraph number, label, and title from which the obligation originates (e.g., "II. Documents Regarding Audits"), and the obligation text (e.g., "retain substantive documents in connection with audits and review for at least 28 quarters"). The mapping component 114 can then utilize one or more of the techniques described herein (e.g., ICC/NLC) to match the extracted policy document(s) 122 features to features in the regulatory model 201 (e.g., the example control framework 123 features can be matched to "Retention of Records Relevant to Audits and Reviews"/"Summary"/"We are adopting rules requiring accounting firms to retain for seven years certain records to their audits and reviews of issuers' financial statements" in the regulatory model 201). Additionally, the mapping component 114 can match an extracted policy document(s) 122 feature to more than one feature in the regulatory model 201.

As explained above, the modeling component 112 considers a plethora of various types of digital sources 106 so as to provide a context for each identified obligation. For example, the modeling component 112 can recognize synonyms and paraphrases for words and/or terms in the identified obligation (e.g., via the specialized term dictionary 206 or the global corpora 203) which can be included in the language model(s) 202, and/or the mappers, and thus the regulatory model 201. Analyzing the various digital sources 106 creates a robust regulatory model 201. For example, if a regulatory document 121 describes "records" in relation to an identified obligation, the modeling component 112 can include terms such as "papers" or "documents" in the extracted features and language model(s) 202. By including synonyms and paraphrases in the creation of the regulatory model 201, the modeling component 112 can create a model that does not solely rely of the textual confines of the regulatory document(s) 121 (e.g., use of the word "record"), but rather encompasses a larger context (e.g., the model can also include "papers" or "documents" where the word "documents" is used). As such, an obligation identified from the policy document(s) 122 that recites "documents" can be matched by the mapping component 114 to an appropriate section of the regulatory model 201 despite the section being built based on an obligation identified from a regulatory document 121 that only recited "records."

As another example of the robustness of the regulatory model 201 that results from considering the input from the various digital sources 106, the modeling component 112 can also consider unit conversions in building the regulatory model 201. For example, the modeling component 112 can extract as a feature from the specialized term dictionary 206 that, in financial terms, "quarter" refers to ¼ of a fiscal year. Thus, the definition of "quarter" in regards to the regulatory document(s) 121 can be included in the language model(s) 202 and therefore the regulatory model 201. As a result, if the regulatory document(s) 121 describes "years" in relation to an identified obligation, the modeling component 112 can include terms such as "quarters" and the necessary unit conversion (e.g., 1 year equals four quarters) in the extracted features and language model(s) 202. Therefore, an obligation identified from the policy document(s) 122 that recites "quarters" can be matched by the mapping component 114 to an appropriate section of the regulatory model 201 despite the section being built based on an obligation identified from a regulatory document 121 that only recited "years."

Figure 4:
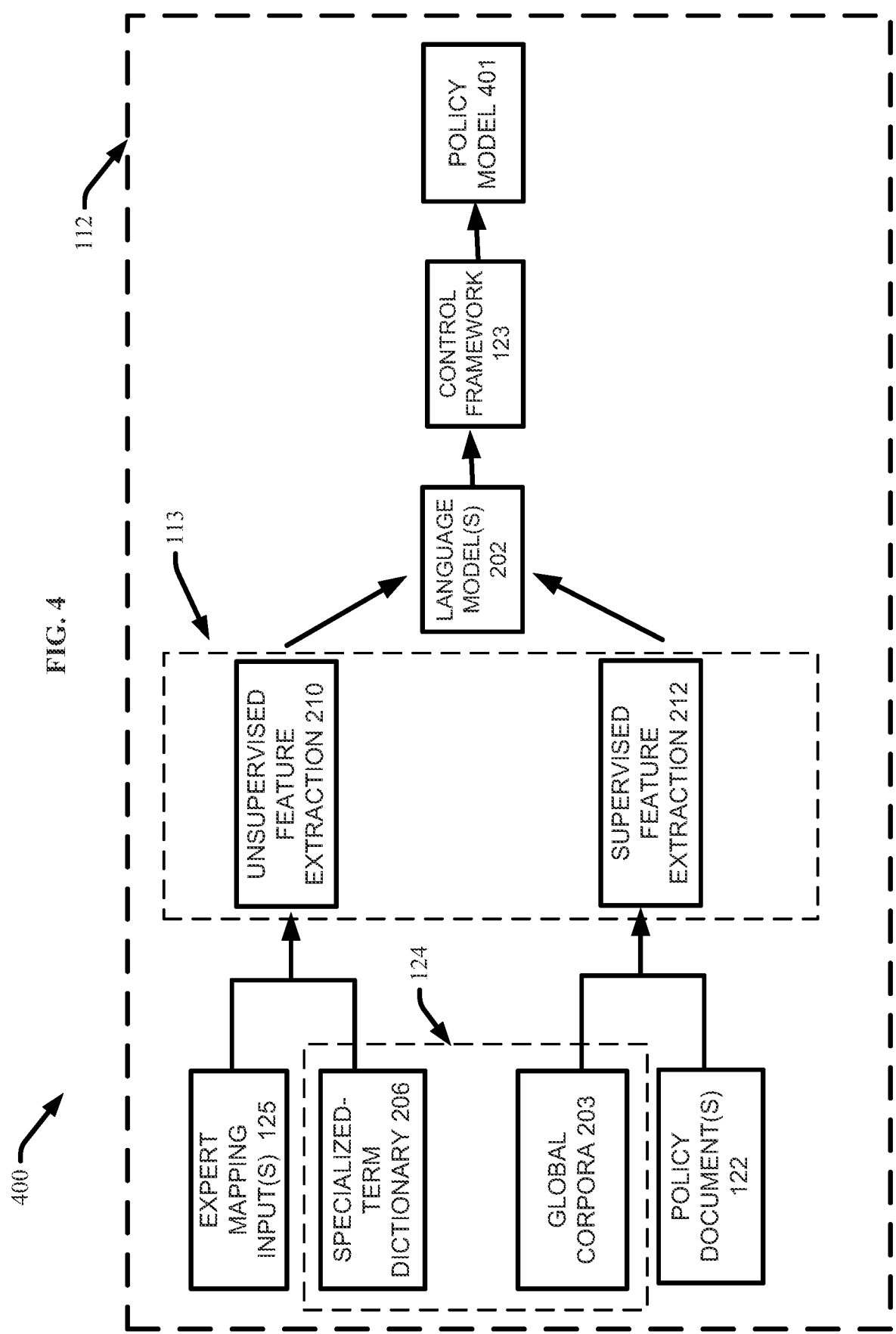
FIG. 4 illustrates a block diagram of an example, non-limiting computer-implemented process facilitating generation of a control model in accordance with one or more embodiments described herein.

In another embodiment, the modeling component 112 creates a control model 401 in addition to the regulatory model 201. FIG. 4 shows a flow diagram illustrating a control model building process 400 in that the modeling component 112 can be configured to generate a control model 401 according to one or more embodiments.

In various embodiments, the modeling component 112 can generate a new control model 401 comprising one or more features performed by an entity as the entity designated operating procedures. The control model 401 can comprise one or more language model(s) 202 containing content extracted from the policy document(s) 122, one or more of the information input(s) 124, and the expert mapping input(s) 125. The control model 401 can be structured in any manner that facilitates organizing the one more or language models 202 to indicate the extraction location and content of the extracted features. For example, the control model 401 can be a spreadsheet, a table, and/or an annotated tree diagram.

The modeling component 112 can receive digital sources 106 as inputs via the reception component 110. For example, the inputs can include policy document(s) 122, one or more of the information input(s) 124, and the expert mapping input(s) 125. The policy document(s) 122 can comprise control policies, control guidelines, control protocols, and/or the like that describe the entity (e.g., a company) operating procedures regarding a topic (e.g., procedures regarding financial recordings and transactions). The specialized term control dictionary 406 can comprise particular definitions for terms relating to the topic and/or field of the control document 404. In an embodiment of the present invention, the modeling component 112 utilizes the policy document(s) 122, the global corpora 203, and the expert mapping input(s) 125. In another embodiment, the modeling component 112, in generating a new control model 401, can utilize policy document(s) 122, the specialized-term dictionary 206, and the expert mapping input(s) 125. In another embodiment, the modeling component 112, in generating a new control model

401, can utilize policy document(s) 122, the global corpora 203, the specialized-term dictionary 206, and the expert mapping input(s) 125.

The extraction component 113 can analyze at least one of the specialized-term dictionary 206 or the expert mapping input(s) 125 and perform the unsupervised feature extraction 210. The unsupervised feature extraction 210 can involve automatically identifying features described by the specialized-term dictionary 206 and/or expert mapping input(s) 125 that can be sorted into a language model(s) 202 or utilized to create a language model(s) 202 without requiring the supervision of a subject expert. A language model 202 in the control model building process 400 can comprise an organized body of data containing one or more extracted features categorized to readily depict the content of the feature(s) and the feature(s) relation to the policy document(s) 122. Language models 202 can have various structures, such as but not limited to, spreadsheets, tables, and/or annotated diagrams (e.g., tree diagrams).

In some embodiments, the unsupervised feature extraction 210 can analyze at least one of the specialized-term dictionary 206 or the expert mapping input(s) 125 utilizing NN attention techniques. In other embodiments, the unsupervised extraction 210 can analyze at least one of the specialized-term dictionary 206 or the expert mapping input(s) 125 utilizing TFIDF extraction techniques.

The extraction component 113 can further analyze at least one of the policy document(s) 122 or the global corpus 203 to perform the supervised feature extraction 212. Referring to FIG. 3, at 302 the received digital sources 106 (e.g., the policy document(s) 122) can be analyzed to identify one or more obligations. The supervised extraction 212 can extract features regarding the identified obligation from the policy document(s) 122, just as features can be extracted from the regulatory document(s) 121 described above. Incorporation of the extracted policy document(s) 122 features into the language model(s) 202 can be supervised by a subject expert.

The supervised feature extraction 212 can result in the extraction of features from the policy document(s) 122 that can include, but are not limited to, the content of policy document(s) 122 obligations and context of the obligations. Features relating the context of the identified obligations can describe how obligations relate to each other and to the policy document(s) 122 as a whole. In some embodiments, the global corpora 203 is used in conjunction with one or more of the word embedding techniques to provide a context in view of modern discussions and expert opinion. At least consideration of the global corpora 203 and incorporation of numerous features for each identified obligation, enables the supervised feature extraction 212 to provide a more accurate context for identified policy document(s) 122 obligations than conventional systems.

Thus, features can be extracted from the expert mapping input(s) 125 and specialized-term dictionary 206 (in reference to the global corpora 203) to create language models 202 via the unsupervised feature extraction 210, and additional features can be extracted from the policy document(s) 122 and the global corpora 203 to further populate the language models 202, and/or create new language models 202, with obligation content and context via the supervised feature extraction 212. In an embodiment, the extraction component 113 can further perform an unsupervised extraction 210 on the control framework 123 using embedding techniques, such as NN attention modeling and TFIDF, to create language models 202 for the control framework 123 that can be combined to create a model of the control framework 123.

Referring back to FIG. 2, the modeling component 112 can further generate one or more mappers. The mappers can combine one or more of the language models 202 and identify where and how the language model(s) 202 correspond to subject matter in the control framework 123. The mappers can utilize one or more software packages that describe behavioral and structural elements of the extracted features, and can be constructed using techniques such as, but not limited to: ICC/NLC; FastXML; SVC (e.g., a SVM); RFC; Glmnet; OVR; sem-sim classification; or a combination thereof.

The modeling component 112 can combine the mappers together and with the control framework 123, thereby mapping the language model(s) 202 to the control framework 123, via one or more ensemble learning techniques. Once the language model(s) 202 are combined, the control model 401 can comprise all the identified obligations, including content and context, in an organizational structure that conveys each obligation's relation to each other and the control document 404. Also, the ensemble learning technique can generate one or more confidence scores associated with one or more of the features comprising the control model 401 to show the control model's 401 confidence regarding the placement and description accuracy of the subject feature.

In an embodiment, the mapping component 114 can combine the control model 401 with the regulatory model 201 to facilitate an analysis of any discrepancy that may exist between the control model 401 and the regulatory model 201 which may indicate that the policy document(s) 122 are non-compliant with the regulatory document(s) 121. For example, the mapping component 114 can analyze the features comprising the regulatory model 201 (e.g., a section entitled "Retention of Records Relevant to Audits and Reviews") and search the control model 401 for a corresponding feature that may regard similar content (e.g., a section entitled "Document Retention"). Each of the models created by the modeling component 112 (e.g., the regulatory model 201 and the control model 401) can comprise features that are not merely confined to the text from that the feature originates (e.g., the regulatory documents 204 or the control documents 404), rather include context derived from additional digital sources 106 such as to facilitate combination of the models without necessitating each model be built upon the same obligation wording, phrasing, or structure.

In an embodiment, the memory 116 can store a language model(s) database 126. The language model(s) database 126 can comprise the language model(s) 202 created to generate a regulatory model 201 or a control model 401. In another embodiment, the memory 116 can store a model database 128 in addition to the language model(s) database 126. The model database 128 can comprise regulatory models 201 and control models 401 previously generated by the system 100.

Figure 5:
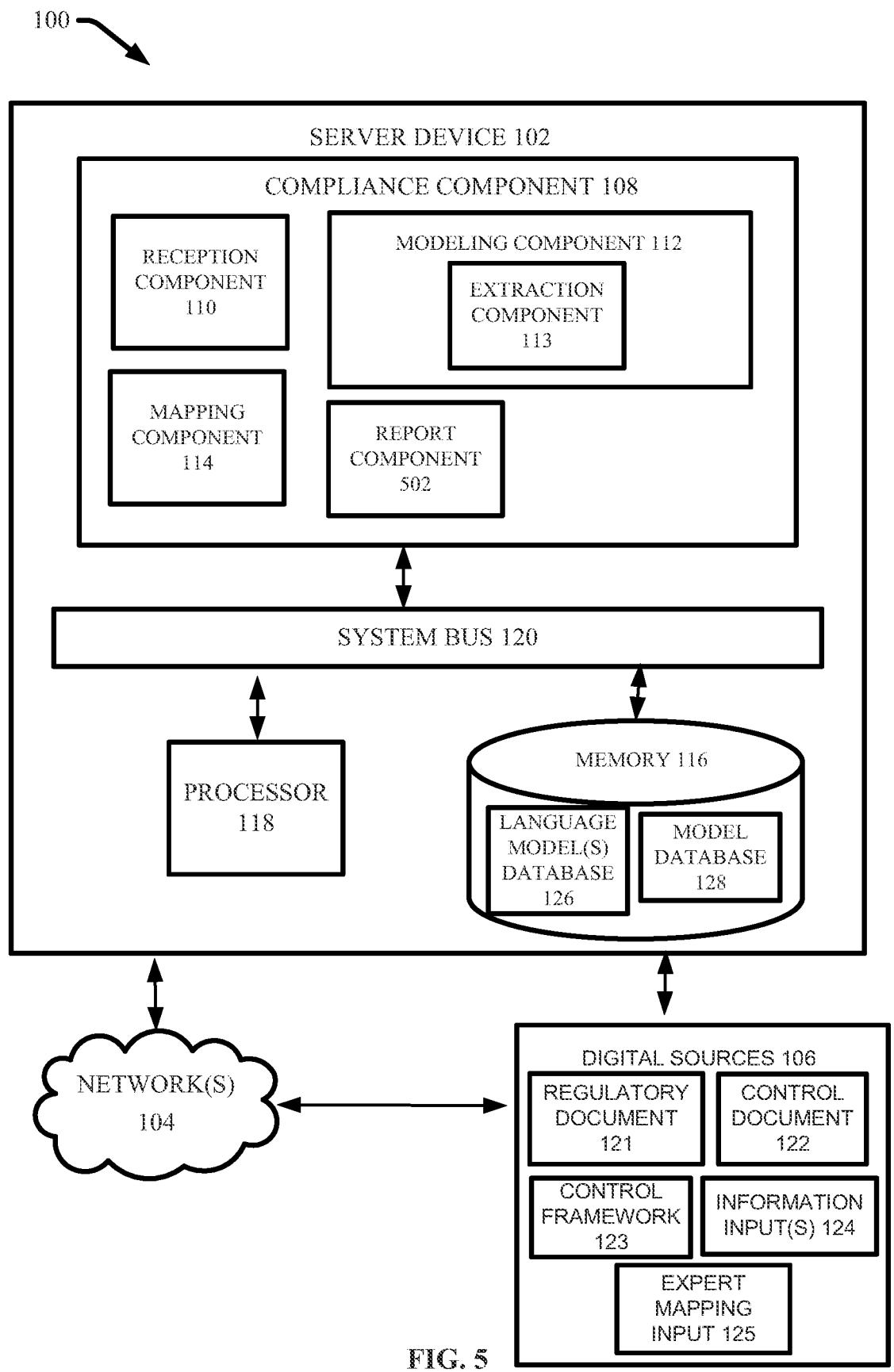
FIG. 5 illustrates a block diagram of an example, non-limiting system that facilitates mapping policy documents to regulatory documents to determine compliance in accordance with one or more embodiments described herein.

FIG. 5 illustrates the server 102 further comprising a report component 502. Repetitive description of like elements employed in other embodiments described herein is omitted for sake of brevity. The report component 502 can be configured to generate a report describing one or more determinations created by the mapping component 114. For example, wherein the mapping component 114 can be configured to match extracted policy document(s) 122 features to a regulatory model 201, the mapping component 114 can communicate to the report component 502 instances in which a feature in the regulatory model 201 does not have a matched feature extracted from the policy document(s) 122. The report component 502 can generate a report that describes instances of non-matching features between the policy document(s) 122 and the regulatory model 201; including, but not limited to, describing: the content of the feature in the regulatory model 201 that is not matched with an extracted policy document(s) 122 feature (e.g., the unmatched feature), and where in the regulatory mode 1201 the unmatched feature is located. Wherein the mapping component 114 can be configured to combine a generated control model 401 with a generated regulatory model 201, the mapping component 114 can communicate to the report component 502 instances in which the control model 401 differs from the regulatory model 201. For example, the regulatory model 201 can comprise a section that is missing from the control model 401. The report component 502 can generate a report that describes the differences between the control model 401 and the regulatory model 201; including, but not limited to, describing: the content of the differences between the compared models and the location of the differences between the compared models. Thus, a user of the system 100 can review the generated report to determine if a policy document(s) 122 complies with all (or, in some embodiments, one or more) the requirements described by a regulatory document 121, and if not, which requirements are not in compliance.

Figure 6:
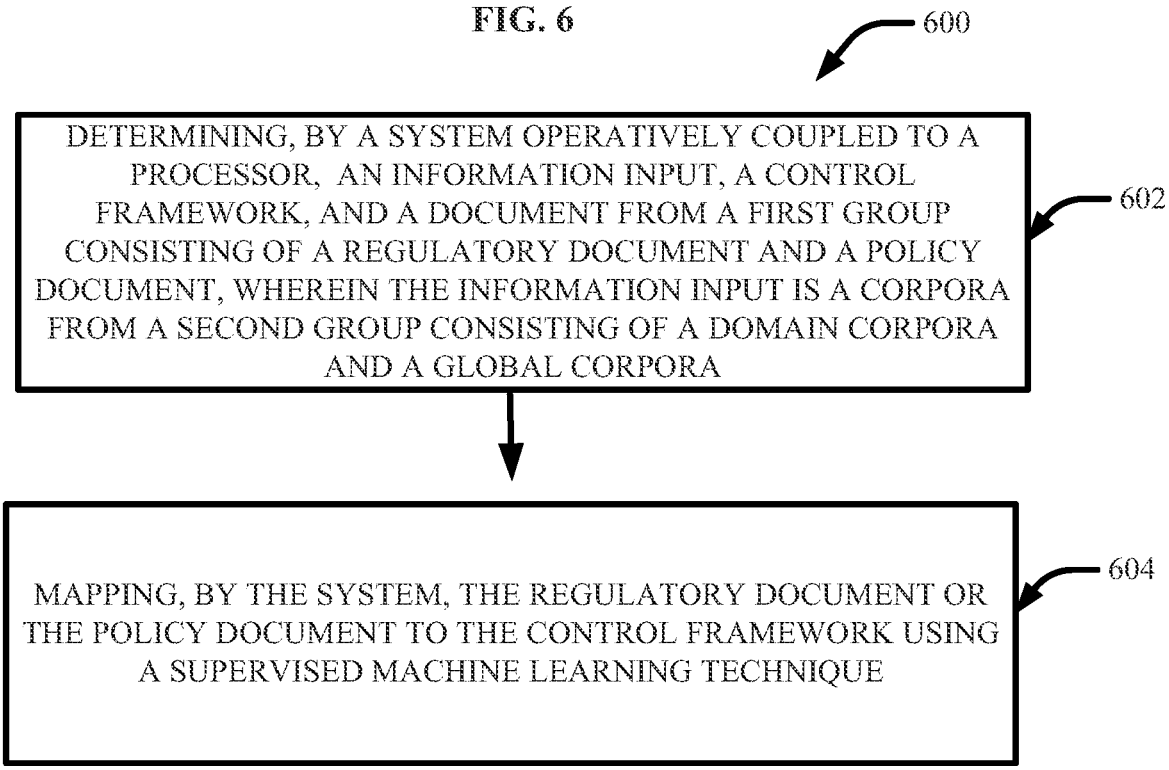
FIG. 6 illustrates a flow diagram of an example, non-limiting computer-implemented method that facilitates mapping policy documents to regulatory documents to determine compliance in accordance with one or more embodiments described herein.
Figure 7:
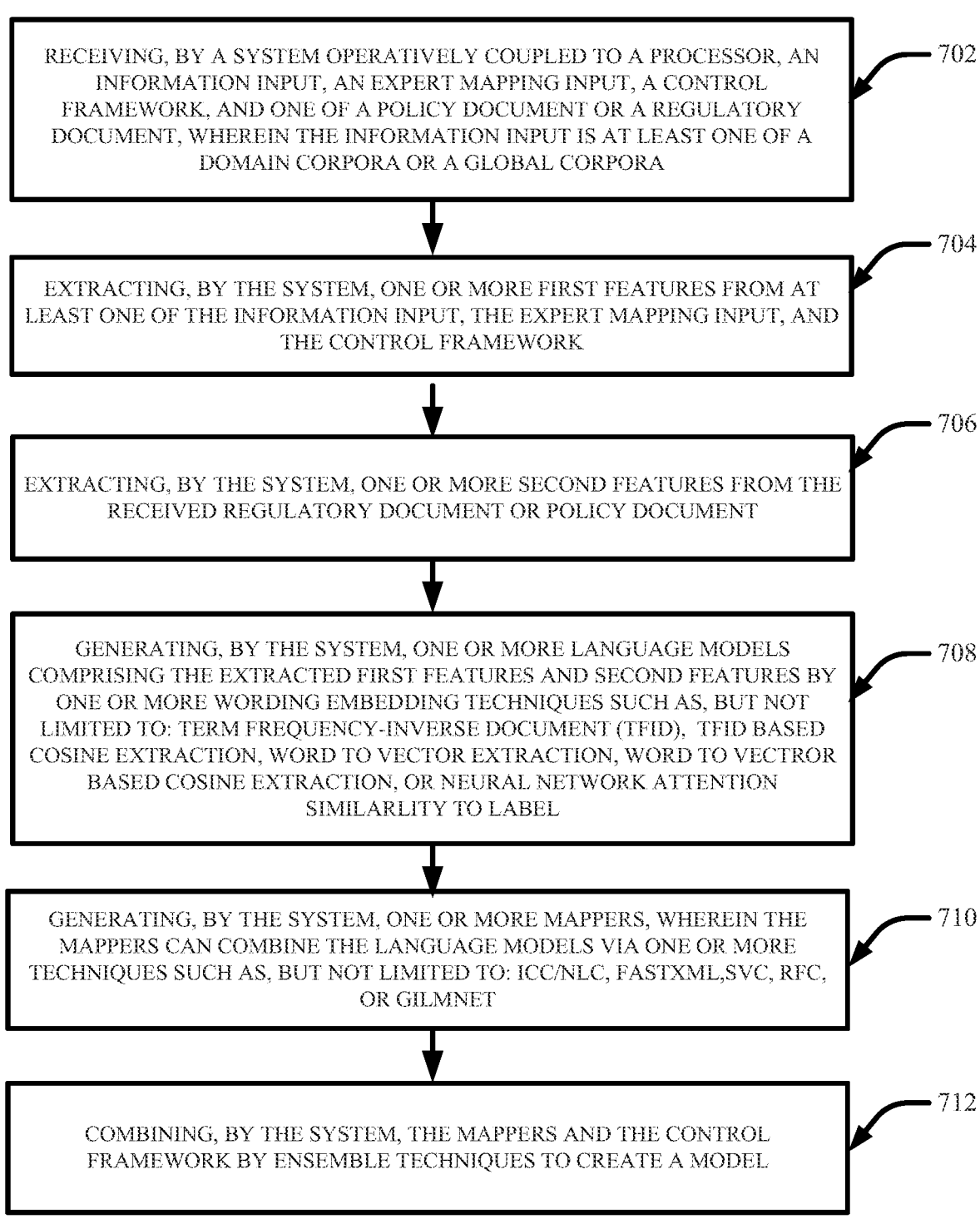
FIG. 7 illustrates a flow diagram of another example, non-limiting computer-implemented method that facilitates mapping policy documents to regulatory documents to determine compliance in accordance with one or more embodiments described herein.
Figure 8:
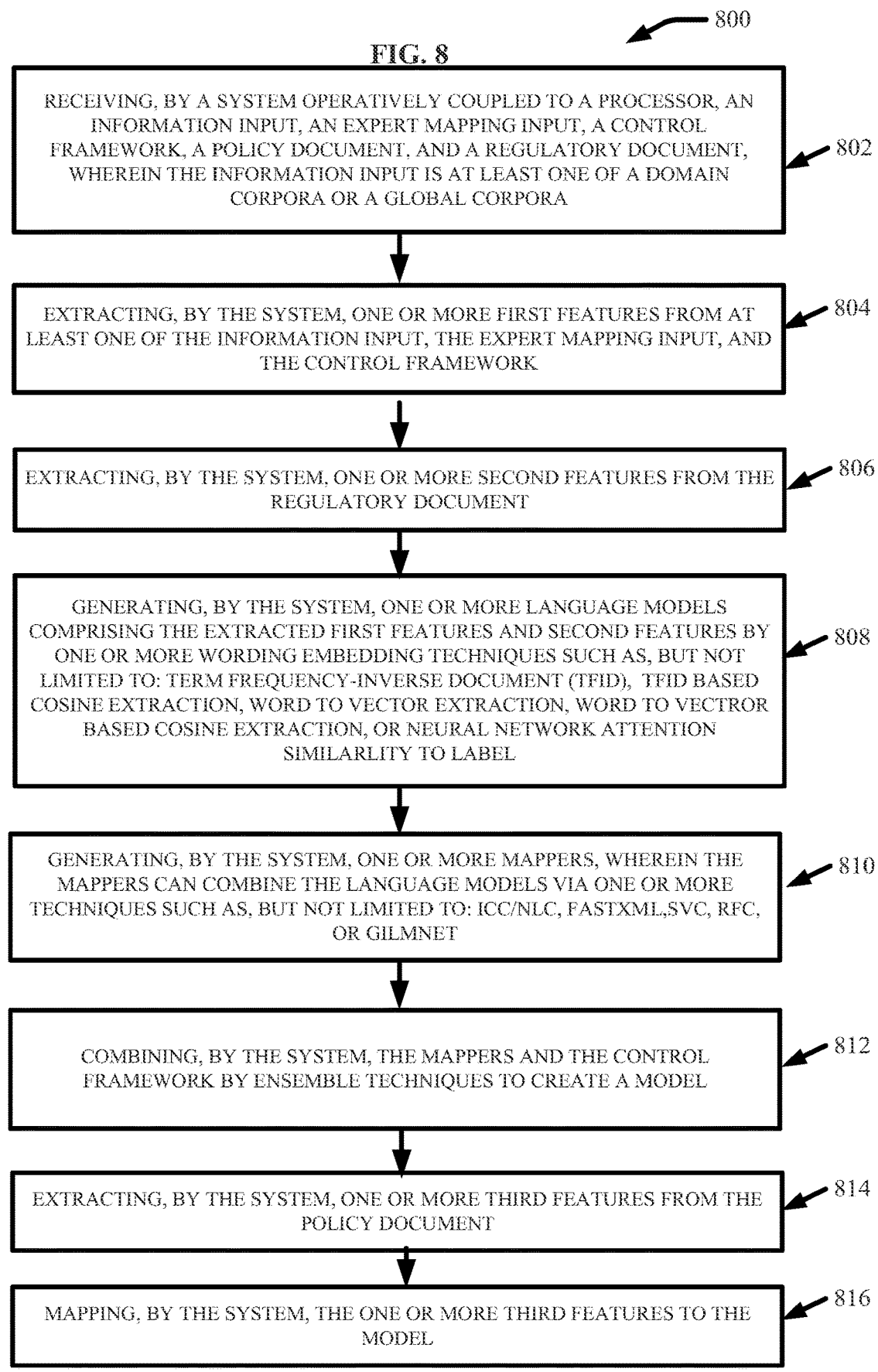
FIG. 8 illustrates a flow diagram of another example, non-limiting computer-implemented method that facilitates mapping policy documents to regulatory documents to determine compliance in accordance with one or more embodiments described herein.

One or more of the computer-implemented methods of FIGS. 6, 7, 8 and/or 9 can be performed by the server device 102. FIG. 6 illustrates a computer-implemented method 600 for mapping policy documents 122 or regulatory documents 121 to a control framework 123 utilizing the system 100 according to one or more embodiments. Repetitive description of like elements employed in other embodiments described herein is omitted for sake of brevity. At 602, the computer-implemented method 600 can comprise determining, by a system 100, an information input 124, a control framework 123, and a document from a first group consisting of a regulatory document 121 and a policy document 122, wherein the information input 124 can comprise a corpora from a second group consisting of a domain corpora (e.g., specialized-term dictionary 206) and a global corpora 203. At 604, the computer-implemented method 600 can map the received regulatory document or the received policy document to the control framework using supervised machine learning techniques.

FIG. 7 illustrates a computer-implemented method 700 for mapping policy documents 122 or regulatory documents 121 to the control framework 123 to generate a model via the system 100 according to one or more embodiments. Repetitive description of like elements employed in other embodiments described herein is omitted for sake of brevity. At 702, the computer-implemented method 700 can comprise receiving, by the system 100, an information input 124, an expert mapping input 125, a control framework 123, and one of a policy document 122 or a regulatory document 121. The information input 124 can comprise at least one of a domain corpora (e.g., specialized-term dictionary 206) or a global corpora 203. At 704, one or more first features can be extracted from at least one of the information input 124, the expert mapping input 125, and the control framework 123 via an unsupervised extraction 210. At 706, one or more second features can be extracted from the received regulatory document 121 or policy document 122 via a supervised extraction 212. At 708, the system 100 can generate one or more language models 202 comprising the extracted one or more first features and the one or more second features. The language models 202 can be generated using word embedding techniques such as, but not limited to: TFID, TFID based cosine extraction, word to vector extraction, word to vector based cosine extraction, or NN attention similarity to label. At 710, the system 100 can generate one or more mappers, wherein the mappers can combine the language models via one or more techniques such as, but not limited to: ICC/NLC, FastXML, SVC, RFC, or Gilmnet. At 712, the system can combine the mappers and the control framework 123 by ensemble techniques (e.g., averaging a probability generated by the mappers) to create a model (e.g., a regulatory model 201 or a control model 401).

FIG. 8 illustrates a computer-implemented method 800 for mapping a policy document(s) 122 to a regulatory model 201 generated via the system 100 according to one or more embodiments. Repetitive description of like elements employed in other embodiments described herein is omitted for sake of brevity. At 802, the computer-implemented method 800 can comprise receiving, by the system 100, an information input 124, an expert mapping input 125, a control framework 123, and one of a policy document 122 or a regulatory document 121. The information input 124 can comprise at least one of a domain corpora (e.g., specialized-term dictionary 206) or a global corpora 203. At 804, one or more first features can be extracted from at least one of the information input 124, the expert mapping input 125, and the control framework 123 via an unsupervised extraction 210. At 806, one or more second features can be extracted from the received regulatory document 121 via a supervised extraction 212. At 808, the system 100 can generate one or more language models 202 comprising the extracted one or more first features and the one or more second features. The language models 202 can be generated using word embedding techniques such as, but not limited to: TFID, TFID based cosine extraction, word to vector extraction, word to vector based cosine extraction, or NN attention similarity to label. At 810, the system 100 can generate one or more mappers, wherein the mappers can combine the language models via one or more techniques such as, but not limited to: ICC/NLC, FastXML, SVC, RFC, or Gilmnet. At 812, the system can combine the mappers and the control framework 123 by ensemble techniques (e.g., averaging a probability generated by the mappers) to create a model (e.g., a regulatory model 201). At 812, the system 100 can extract one or more third features from the policy document(s) 122 via a supervised extraction 212. At 816, the system 100 can map the one or more third features to the model.

Figure 9:
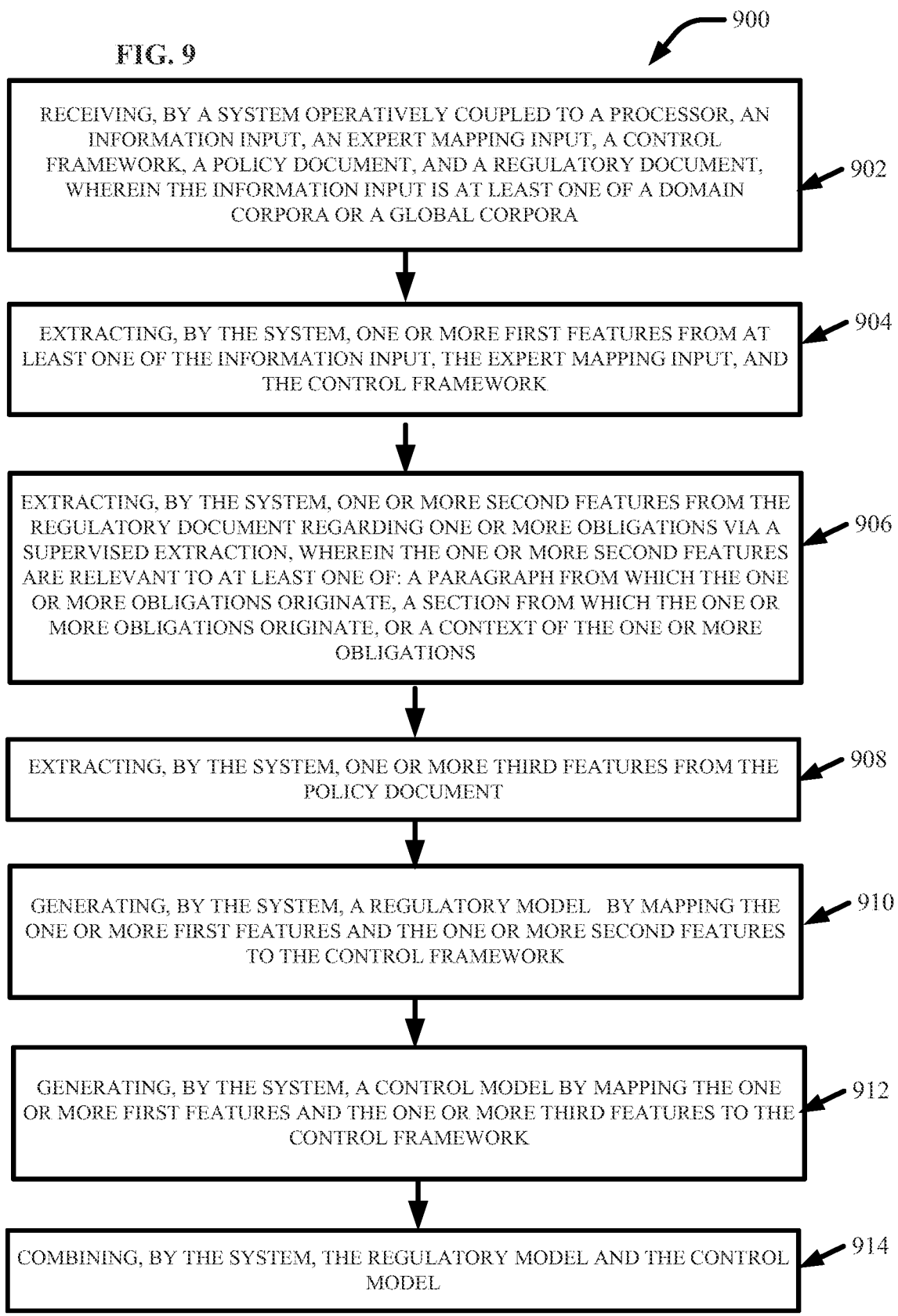
FIG. 9 illustrates a flow diagram of another example, non-limiting computer-implemented method that facilitates mapping policy documents to regulatory documents to determine compliance in accordance with one or more embodiments described herein.

FIG. 9 illustrates a computer-implemented method 900 for mapping regulatory documents 121 to a control framework to generate a regulatory model 201, mapping policy documents 122 to the control framework to generate a control model 401, and combining the regulatory model 201 and the control model 401. Repetitive description of like elements employed in other embodiments described herein is omitted for sake of brevity.

At 902, the computer-implemented method 900 can comprise receiving, by the system 100, an information input 124, an expert mapping input 125, a control framework 123, and one of a policy document 122 or a regulatory document 121. The information input 124 can comprise at least one of a domain corpora (e.g., specialized-term dictionary 206) or a global corpora 203. At 904, one or more first features can be extracted from at least one of the information input 124, the expert mapping input 125, and the control framework 123 via an unsupervised extraction 210. At 906, one or more second features can be extracted from the regulatory document 121 regarding one or more obligations via a supervised extraction 212. The supervised extraction can utilize word embedding techniques. The one or more second features can be relevant to at least one of: a paragraph from which the one or more obligations originate; a section from which the one or more obligations originate; or a context of the one or more obligations. At 908, the system 100 can extract one or more third features from the policy document 122 (e.g., via a supervised extraction 212). At 910 a regulatory model 201 can be generated by mapping the one or more first features and the one or more second features to the control framework 123. At 912 a control model 401 can be generated by mapping the one or more first features and the one or more third features to the control framework 123. At 914, the system 100 can combine the regulatory model 201 and the control model 401.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 10:
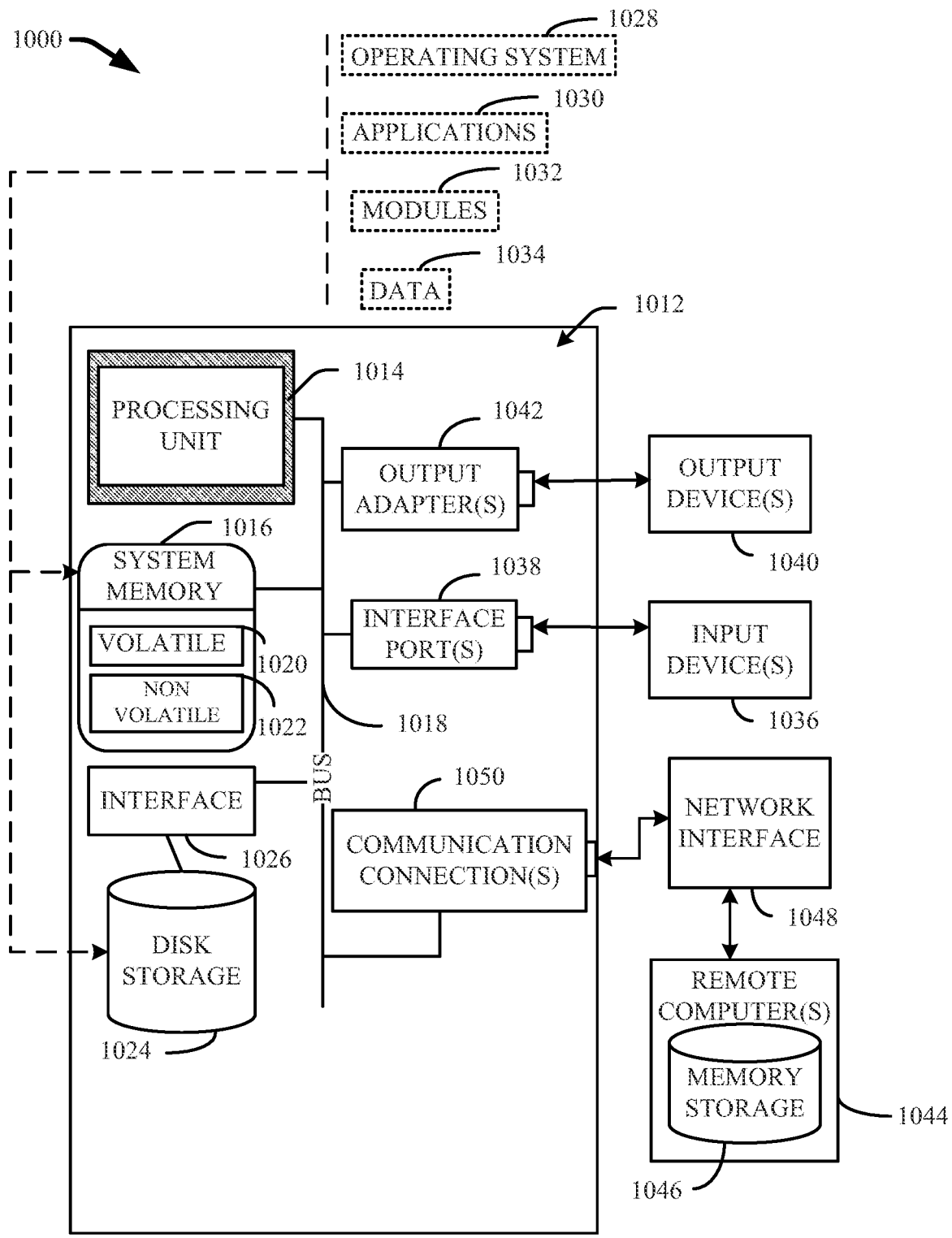
FIG. 10 illustrates a block diagram of an example, non-limiting operating environment in which one or more embodiments of the systems, computer-implemented processes, and computer-implemented methods described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 can couple system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1324 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012. System applications 1030 take advantage of the management of resources by operating system 1030 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1042 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

The description of the various embodiments of the present invention have been presented for purpose of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A computer-implemented method, comprising:
   generating, by a system operatively coupled to a processor, a language model for a policy document and a language model for a regulatory document, wherein the generating incorporates extracted one or more features, a global corpora and one or more annotations of the policy document, wherein the one or more annotations are employed by the system to facilitate the generating the language model for the policy document via supervised feature extraction;
   generating, by the system, a language model for expert mapping inputs and a specialized term dictionary via unsupervised feature extraction;
   verifying, by the system, whether the policy document is in compliance with at least one identified rule described by the regulatory document based on combining the language model for the policy document and the language model for the regulatory document;
   mapping, by the processor, the one or more features to a control framework using a supervised machine learning technique to generate a regulatory model;
   mapping, by the processor, the policy document to the regulatory model; and
   determining, by the processor, whether the policy document complies with rules for the regulatory document based on the mapping the policy document to the regulatory model.

2. The computer-implemented method of claim 1, further comprising generating one of the regulatory document or the policy document.

3. The computer-implemented method of claim 2, further comprising generating a plurality of mappers.

4. The computer-implemented method of claim 3, further comprising generating an ensemble to combine the plurality of mappers.

5. The computer-implemented method of claim 4, wherein the specialized term dictionary is combined with the plurality of mappers and input to the unsupervised feature extraction, and wherein the plurality of mappers are combined based on averaging a probability generated by one or more mappers of the plurality of mappers.

6. A computer-implemented method, comprising:
   extracting, by a system operatively coupled to a processor, via supervised feature extraction, one or more features of a combination of a regulatory document and a control model as respective vectors, wherein the one or more features are associated with at least one identified rule regarding a subject matter of a policy document;
   generating, by the system, one or more confidence scores associated with the one or more features and regarding confidence in placement and description accuracy of the one or more features;
   generating, by the system, respective language models for the policy document and the control document, wherein the generating the respective language models incorporates the extracted one or more features;
   outputting, by the system, a report indicative of whether the policy document is in compliance with the at least one identified rule based on a compliance determination generated by comparing the respective language models;
   mapping, by the system, the one or more first features and one or more second features to a control framework using a supervised machine learning technique to generate a regulatory model;
   mapping, by the system, the policy document to the regulatory model; and
   determining, by the system, whether the policy document complies with rules for the regulatory document based on the mapping the policy document to the regulatory model.

7. The computer-implemented method of claim 6, further comprising:
   generating, by the system, one or more language models for an expert mapping input employing unsupervised feature extraction.

8. The computer-implemented method of claim 7, wherein mapping the regulatory document or the policy document comprises mapping the one or more language models to the control framework.

9. A system, comprising:
a memory that stores computer executable components; and
a processor that executes the computer executable components stored in the memory, wherein the computer executable components comprise:
   a mapping component that:
      maps one or more features to a control framework using a supervised machine learning technique to generate a regulatory model; and
      maps a policy document to the regulatory model; and
   a compliance component that determines whether the policy document complies with rules for a regulatory document based on the mapping the policy document to the regulatory model, wherein the compliance component determines that the policy document fails to comply with the rules for the regulatory document based on identification of one or more segments of the regulatory document without a matched policy document, wherein the one or more segments indicates a gap in coverage of the policy document such that the policy document fails to describe a feature that meets requirements of one or more obligations from the regulatory document.

10. The system of claim 9, further comprising an extraction component, wherein the extraction component performs an extraction selected from a group consisting of a supervised extraction and an unsupervised feature extraction to extract the one or more features.

11. The system of claim 9, further comprising a reception component that receives the information input.

12. The system of claim 11, wherein the information input comprises a global corpora from a group consisting of a domain corpora and a global corpora.

13. The system of claim 10, wherein the unsupervised extraction further utilizes neural network attention.

14. A system, comprising:
a memory that stores computer executable components; and
a processor that executes the computer executable components stored in the memory, wherein the computer executable components comprise:
   an extraction component that extracts, via unsupervised feature extraction and via supervised feature extraction, one or more features as respective vectors from a regulatory document, a policy document, and information input, wherein the system assigns a confidence score to the one or more features, wherein the confidence score indicates a confidence level regarding placement and description accuracy of the one or more features; and
   a mapping component that:
      maps the one or more features to a control framework using a supervised machine learning technique to generate a regulatory model; and
      maps the policy document to the regulatory model; and
   a compliance component that determines whether the policy document complies with rules for the regulatory document based on the mapping the policy document to the regulatory model.

15. The system of claim 14, wherein the information input comprises the global corpora.

16. The system of claim 15, wherein the one or more features extracted from the global corpora provide context for the one or more features extracted from the regulatory document.

17. The system of claim 14, wherein the memory further stores a language model database.

18. The system of claim 14, wherein the extraction component further performs an extraction from a second group consisting of supervised extraction and create a language model with obligation content and context.

19. A computer program product for determining compliance between documents, the computer program product comprising a computer readable storage medium having program instructions embodied therewith, the program instructions executable by a processing component to cause the processing component to:
   generate, by the processor, a control model by mapping one or more first features and one or more second features from a policy document to a control framework;
   generate, by the processor, one or more confidence scores associated with the one or more first features or the one or more second features and regarding confidence in placement and description accuracy of the one or more first features or the one or more second features, wherein the one or more confidence scores are indicative of confidence of the control model regarding the placement and description accuracy of the one or more first features;
   map, by the processor, the one or more first features and the one or more second features to a control framework using a supervised machine learning technique to generate a regulatory model;
   map, by the processor, the policy document to the regulatory model;
   determine, by the processor, whether the policy document complies with rules for the regulatory document based on the mapping the policy document to the regulatory model; and
   verify, by the processor, whether the policy document abides by one or more obligations by combining a regulatory model and the control model into a combined model.

20. The computer program product of claim 19, wherein the control model is comprised of one or more language models determined via unsupervised feature extraction and via supervised feature extraction, wherein the unsupervised feature extraction comprises automatically identifying the one or more first features by a specialized term dictionary or expert mapping input employing neural network attention techniques and utilized to create the language model without requiring the supervision of a subject expert or entity.

* * * * *